(12) United States Patent
Kim

(10) Patent No.: US 7,681,215 B2
(45) Date of Patent: Mar. 16, 2010

(54) EMERGENCY ALERT SIGNALING METHOD AND DIGITAL TELEVISION RECEIVER

(75) Inventor: Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 503 days.

(21) Appl. No.: 11/594,999

(22) Filed: Nov. 9, 2006

(65) Prior Publication Data

US 2007/0107009 A1 May 10, 2007

(51) Int. Cl.
H04N 7/10 (2006.01)
H04N 7/025 (2006.01)

(52) U.S. Cl. ............... 725/33; 725/67; 725/68; 725/70; 725/71; 340/286.02; 455/404.1

(58) Field of Classification Search .................. 725/33, 725/67–68, 70–71; 340/286.02; 455/404.1
See application file for complete search history.

(56) References Cited

U.S. PATENT DOCUMENTS

| | | | | |
|---|---|---|---|---|
| 4,656,629 A | * | 4/1987 | Kondoh et al. | 370/522 |
| 5,659,366 A | * | 8/1997 | Kerman | 725/34 |
| 5,760,820 A | * | 6/1998 | Eda et al. | 725/33 |
| 6,020,913 A | * | 2/2000 | Bush et al. | 725/33 |
| 6,204,761 B1 | * | 3/2001 | Vanderable | 340/539.28 |
| 6,543,051 B1 | * | 4/2003 | Manson et al. | 725/33 |
| 7,038,581 B2 | * | 5/2006 | Kendall et al. | 340/506 |
| 7,054,612 B2 | * | 5/2006 | Patel | 455/404.1 |
| 7,159,230 B2 | * | 1/2007 | Manson et al. | 725/33 |
| 7,444,657 B2 | * | 10/2008 | Kendall et al. | 725/33 |
| 7,454,773 B2 | * | 11/2008 | Pugel et al. | 725/33 |
| 7,506,349 B2 | * | 3/2009 | Rodolico | 725/33 |
| 2002/0157101 A1 | * | 10/2002 | Schrader et al. | 725/64 |
| 2003/0093788 A1 | * | 5/2003 | Takenaka | 725/33 |
| 2003/0121036 A1 | * | 6/2003 | Lock et al. | 725/33 |
| 2003/0197732 A1 | * | 10/2003 | Gupta | 345/764 |
| 2005/0086685 A1 | * | 4/2005 | Rahman et al. | 725/33 |
| 2005/0118984 A1 | * | 6/2005 | Akiyama et al. | 455/404.2 |
| 2005/0193408 A1 | * | 9/2005 | Sull et al. | 725/32 |

(Continued)

FOREIGN PATENT DOCUMENTS

KR 10-2002-0096107 12/2002

(Continued)

OTHER PUBLICATIONS

Society of Cable Telecommunications Engineers (SCTE), Emergency Alert Message For Cable, Dec. 2002, ANSI, J-STD-042, All Pages.*

(Continued)

*Primary Examiner*—Jason P Salce
(74) *Attorney, Agent, or Firm*—McKenna Long & Aldridge LLP

(57) ABSTRACT

A digital television receiver includes a tuner receiving a digital television signal including a DCCT, a demodulator demodulating the digital television signal, and a demultiplexer demultiplexing the DCCT from the demodulated signal. The receiver further includes a decoder parsing channel ID information and a priority code from the DCCT, where the channel ID information specifies an emergency alert channel associated with an emergency alert event and the priority code specifies an alert priority of the emergency alert event. The receiver further includes a controller that controls operation of the tuner to automatically tune to the emergency alert channel based upon the alert priority.

10 Claims, 14 Drawing Sheets

| Value of DCC Selection Type | Name and Meaning | Value of DCC Selection ID | Test | Logic |
|---|---|---|---|---|
| *0x00 | Unconditional channel change | n.a. | Term always evaluates True. | True |
| *0x01 | Numeric Postal Code Inclusion-inclusion test on numeric postal codes, with wild-card match on "?" characters | 8 ASCII characters representing a specific or range of numeric character postal codes in the range 00000001 to 00099999 ASCII "?" matches any digit 0-9 | Term evaluates True if the DCCRR postal code matches, in the last five character positions, for those selection ID characters not equal to "?" and False otherwise. If postal code not specified in DCCRR, term evaluates False. | True |
| | | skip | | |
| *0xEA | EAS Category Code-Inclusion test on EAS Priority Codes, EAS Originator Codes, EAS Events codes. | Up to eight EAS category codes | Total 8Bytes are comprised of 1byte:Priority Code 1byte:Originator Code 1byte:Event Code and the other 5bytes:reserved | All means the each condition (or the combination of the each condition) |
| *0xEB-0xFF | Reserved | Reserved | | |

U.S. PATENT DOCUMENTS

| | | | |
|---|---|---|---|
| 2005/0212504 A1* | 9/2005 | Revital et al. | 324/100 |
| 2006/0020959 A1* | 1/2006 | Masuda | 725/25 |
| 2006/0048180 A1* | 3/2006 | Kendall et al. | 725/33 |
| 2006/0059512 A1* | 3/2006 | Pugel | 725/33 |
| 2006/0159128 A1* | 7/2006 | Chen et al. | 370/486 |
| 2007/0118861 A1* | 5/2007 | Stone | 725/80 |
| 2007/0136743 A1* | 6/2007 | Hasek et al. | 725/33 |
| 2007/0157209 A1* | 7/2007 | Hashimoto et al. | 718/104 |
| 2008/0046524 A1* | 2/2008 | Jerding et al. | 709/206 |

FOREIGN PATENT DOCUMENTS

WO    WO 01/05152    1/2001

OTHER PUBLICATIONS

ATSC, PSIP Implementation Guidelines for Broadcasters, Jun. 25, 2002, A/69, pp. 39, 81-83 and 89-91.*

* cited by examiner

FIG. 1

| Syntax | No. of Bits | Format |
|---|---|---|
| directed_channel_change_table_section () { | | |
|     table_id | 8 | 0xD3 |
|     section_syntax_indicator | 1 | '1' |
|     private_indicator | 1 | '1' |
|     reserved | 2 | '11' |
|     sectin_length | 12 | uimsbf |
|     dcc_subtype | 8 | 0x00 |
|     dcc_id | 8 | uimsbf |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     dcc_test_count | 8 | uimsbf |
|     for(i=0;i<dcc_test_count;i++) { | | |
|         dcc_context | 1 | uimsbf |
|         reserved | 3 | '111' |
|         dcc_from_major_channel_number | 10 | uimsbf |
|         dcc_from_minor_channel_number | 10 | uimsbf |
|         reserved | 4 | '1111' |
|         dcc_to_major_channel_number | 10 | uimsbf |
|         dcc_to_minor_channel_number | 10 | uimsbf |
|         dcc_start_time | 32 | uimsbf |
|         dcc_end_time | 32 | uimsbf |
|         dcc_term_count | 8 | uimsbf |
|         for(j=0;j<dcc_term_count;j++) { | | |
|             dcc_selection_type | 8 | uimsbf |
|             dcc_selection_id | 64 | uimsbf |
|             reserved | 6 | '111111' |
|             dcc_term_descriptors_length | 10 | uimsbf |
|             for(k=0;k<N;k++) { | | |
|                 dcc_term_descriptor() | | |
|             } | | |
|         } | | |
|         reserved | 6 | '111111' |
|         dcc_test_descriptors_length | 10 | uimsbf |
|         for(j=0;j<N;j++) { | | |
|             dcc_test_descriptor() | | |
|         } | | |
|     } | | |
|     reserved | 6 | '111111' |
|     dcc_additional_descriptors_length | 10 | uimsbf |
|     for(i=0;i<N;i++) { | | |
|         dcc_additional_descriptor() | | |
|     } | | |
|     CRC_32 | 32 | rpchof |
| } | | |

FIG. 2

| Syntax | Bits | Format |
|---|---|---|
| dcc_selection_code_table_section () { | | |
|   table_id | 8 | 0xD4 |
|   section_syntax_indicator | 1 | '1' |
|   private_indicator | 1 | '1' |
|   reserved | 2 | '11' |
|   sectin_length | 12 | uimsbf |
|   dccsct_type | 16 | uimsbf |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   protocol_version | 8 | uimsbf |
|   updates_defined | 8 | uimsbf |
|   for(i=0;i<updates_defiened;i++) { | | |
|     update_type | 8 | uimsbf |
|     update_data_length | 8 | uimsbf |
|     if(update_type==new_genre_category) { | | |
|       genre_category_code | 8 | uimsbf |
|       genre_catefory_name_text() | var | |
|     } | | |
|     if(update_type==new_state) { | | |
|       dcc_state_location_code | 8 | uimsbf range 1..99 |
|       dcc_state_location_text() | var | |
|     } | | |
|     if(update_type==new_county) { | | |
|       state_code | 8 | uimsbf range 1..99 |
|       reserved | 6 | '111111' |
|       dcc_county_location_code | 10 | uimsbf range 1..99 |
|       dcc_county_location_code_text() | var | |
|     } | | |
|     if(update_type==new_EAS_category) { | | |
|       EAS_category_code | 8 | uimsbf |
|       EAS_category_name_text() | var | |
|     } | | |
|     reserved | 6 | '111111' |
|     dccsct_descriptors_length | 10 | uimsbf |
|     for(j=0;j<N;j++) { | | |
|       dccsct_descriptors() | | |
|     } | | |
|   } | | |
|   reserved | 6 | '111111' |
|   dccsct_additional_descriptors_length | 10 | uimsbf |
|   for(i=0;i<N;i++) { | | |
|     dccsct_additional_descriptor() | | |
|   } | | |
|   CRC_32 | 32 | rpchof |
| } | | |

FIG. 3

| Value of DCC Selection Type | Name and Meaning | Value of DCC Selection ID | Test | Logic |
|---|---|---|---|---|
| *0x00 | Unconditional channel change | n.a. | Term always evaluates True. | True |
| *0x01 | Numeric Postal Code Inclusion-inclusion test on numeric postal codes, with wild-card match on "?" characters | 8 ASCII characters representing a specific or range of numeric character postal codes in the range 00000001 to 00099999 ASCII "?" matches any digit 0-9 | Term evaluates True if the DCCRR postal code matches, in the last five character positions, for those selection ID characters not equal to "?" and False otherwise. If postal code not specified in DCCRR, term evaluates False. | True |
| | | skip | | |
| *0xEA | EAS Category Code- Inclusion test on EAS Priority Codes, EAS Originator Codes, EAS Events codes. | Up to eight EAS category codes | Total 8Bytes are comprised of 1byte:Priority Code 1byte:Originator Code 1byte:Event Code and the other 5bytes:reserved | All means the each condition (or the combination of the each condition) |
| *0xEB-0xFF | Reserved | Reserved | | |

FIG. 4A

<Alert Priority Codes(Example)>

| Value | Alert_priority | Meaning | Audio Required |
|---|---|---|---|
| 0x00 | 0 | Test Message: the alert shall be discarded by all receiving equipment except those designed to acknoledge and process test meaages. | No |
| 0x01-02 | 1-2 | [Reserved] | |
| 0x03 | 3 | Low priority:the alert may be disregarded if processing the alert would interrupt viewing of an access-controlled servece. | No |
| 0x04-06 | 4-6 | [Reserved] | |
| 0x07 | 7 | Medium priority:the alert may be disregarded if processing the alert would interrupt viewing of a pay-per-view event. | No |
| 0x08-0A | 8-10 | [Reserved] | |
| 0x0B | 11 | High priority:the alert shall be processed unconditionally, but can involve text-only display if no audio is available. | No |
| 0x0C-0E | 12-14 | [Reserved] | |
| 0x0F | 15 | Maximum priority:the alert shall be processed unconditionally. If audio is avilable without tuning to the details channel, that audio shall be substituted for program audio for the duration of the alert message. If audio is not available by means other than by tuning to the details channel, the details channel shall be acquired for the duration of the alert message. | Yes |
| 0x10-4F | | [Reserved] | |

FIG. 4B

<EAS Originator Code(Example)>

| Value | EAS_originator_code | Meaning |
|---|---|---|
| 0x50 | EAN | Emergency Action Notification Network |
| 0x51 | PEP | Primary Entry Point System |
| 0x52 | WXR | National Weather Service |
| 0x53 | CIV | Civil authorities |
| 0x54 | EAS | Broadcast station or cable system |
| 0x55-6F | [Reserved] | |

FIG. 4C

<EAS Event Code(Example)>

| Value | EAS_event_code | Nature of Activation |
|---|---|---|
| | National Codes: | |
| 0x70 | EAN | Emergency Action Notification (National only) |
| 0x71 | EAT | Emergency Action Termination (National only) |
| 0x72 | NIC | National Information Center |
| 0x73 | RMT | Required Monthly Test |
| 0x74 | RWT | Required Weekly Test |
| 0x75 | NPT | National Periodic Test |
| | Local Codes: | |
| 0x90 | ADR | Administrative Message |
| 0x91 | BZW | Blizzard Warning |
| 0x92 | CEM | Civil Emergency Message |
| 0x93 | EVI | Evacuation Immediate |
| 0x94 | FFS | Flash Flood Statement |
| 0x95 | FFW | Flash flood Warning |
| 0x96 | FFA | Flash flood Watch |
| 0x97 | FLS | Flood Statement |
| 0x98 | FLW | Flood Warning |
| 0x99 | FLA | Flood Watch |
| 0x9A | HWW | High Wind Warning |
| 0x9B | HWA | High Wind Watch |
| 0x9C | HLS | Hurricane Statement |
| 0x9D | HUW | Hurricane Warning |
| 0x9E | HUA | Hurricane Watch |
| 0x9F | DMO | Practive/Demo Warning |
| 0xA0 | SVR | Severe Thunderstorm Warning |
| 0xA1 | SVA | Severe Thunderstorm Watch |
| 0xA2 | SVS | Severe Weather Statement |
| 0xA3 | SPS | Special Weather Statement |
| 0xA4 | TOR | Tornado Warning |
| 0xA5 | TOA | Tornado Watch |
| 0xA6 | TSW | Tsunami Warning |
| 0xA7 | TSA | Tsunami Watch |
| 0xA8 | WSW | Winter Storm Waring |
| 0xA9 | WSA | Winter Storm Watch |
| 0xAA-FE | [Reserved] | |
| 0xFF | Not Available | |

FIG. 5A

<dcc_selection_id code Packing of DCCT>

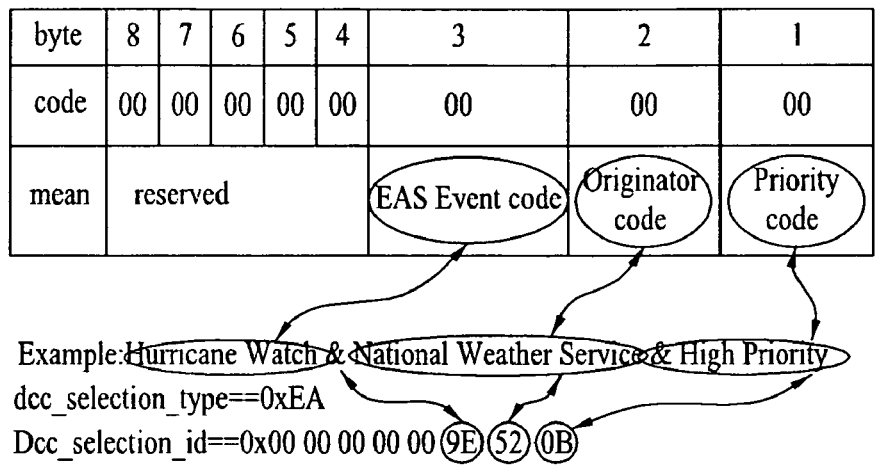

Example: Hurricane Watch & National Weather Service & High Priority
dcc_selection_type==0xEA
Dcc_selection_id==0x00 00 00 00 00 9E 52 0B

FIG. 5B

<Extension of update Type Coding>

| update_type_Value | Meaning |
|---|---|
| 0x00 | Reserved |
| 0x01 | new_genre_category-Genre table update |
| 0x02 | new_state-Addition to state code data |
| 0x03 | new_county-Addition to county code data |
| 0x04 | new_EAS_category-EAS table update |
| 0x05-FF | Reserved for future use |

FIG. 5C

<EAS_category_code & EAS category_name_text of DCCSCT>

|  | No. of Bits | Value(example) |
|---|---|---|
| if (update_type==new_EAS_category) { |  |  |
| EAS_category_code | 8 | 0x9E |
| EAS_category_name_text() | var | Hurricane Watch |
| } |  |  |

FIG. 5D

| Value of DCC Selection Type | Name and Meaning | Value of DCC Selection ID | Test | Logic |
|---|---|---|---|---|
| *0x00 | Unconditional channel change | n.a. | Term always evaluates True. | True |
| *0x01 | Numeric Postal Code Inclusion-inclusion test on numeric postal codes, with wild-card match on "?" characters | 8 ASCII characters representing a specific or range of numeric character postal codes in the range 00000001 to 00099999 ASCII "?" matches any digit 0-9 | Term evaluates True if the DCCRR postal code matches, in the last five character positions, for those selection ID characters not equal to "?" and False otherwise. If postal code not specified in DCCRR, term evaluates False. | True |
|  |  | skip |  |  |
| *0xEA | EAS Category Code-Inclusion test on EAS Priority Codes, EAS Originator Codes, EAS Events codes. | Up to eight EAS category codes | Total 8Bytes are comprised of 1byte:Priority Code 1byte:Originator Code 1byte:Event Code and the oter 5bytes:reserved or 1byte:Priority Code 1byte:Originator Code 1byte:Event Code 1byte:Location Code and the other 4bytes:reserved | All means the each condition (or the combination of the each condition) |
| *0xEB-0xFF | Reserved | Reserved |  |  |

FIG. 5E

| Value of DCC Selection Type | Name and Meaning | Value of DCC Selection ID | Test | Logic |
|---|---|---|---|---|
| *0x00 | Unconditional channel change | n.a. | Term always evaluates True. | True |
| *0x01 | Numeric Postal Code Inclusion-inclusion test on numeric postal codes, with wild-card match on "?" characters | 8 ASCII characters representing a specific or range of numeric character postal codes in the range 00000001 to 00099999 ASCII "?" matches any digit 0-9 | Term evaluates True if the DCCRR postal code matches, in the last five character positions, for those selection ID characters not equal to "?" and False otherwise. If postal code not specified in DCCRR, term evaluates False. | True |
| | | skip | | |
| *0x0C | Geographic Location Inclusion | Value is a location_code conforming to the state_code, county_subdivision, and county_code. | Term evaluates True only if the DCCRR'S geographic location matches the selection ID and False otherwise. If the geographic location data is not specified in the DCC, term evaluates False. | |
| | | skip | | |
| *0x1C | Geographic Location Exclusion | Value is a location_code conforming to the state_code, county_subdivision, and county_code. | Term evaluates True if the DCCRR's geographic location does not match the selection ID and False otherwise. If the geographic location data is not specified in the DCC, term evaluates False. | |
| | | skip | | |
| *0xEA | EAS Category Code-Inclusion test on EAS Priority Codes, EAS Originator Codes, EAS Events codes. | Up to eight EAS category codes | Total 8Bytes are comprised of 1byte:Priority Code 1byte:Originator Code 1byte:Event Code and the other 5bytes:reserved | All means the each condition (or the combination of the each condition) |
| *0xEB-0xFF | Reserved | Reserved | | |

FIG. 5F

| Syntax | No. of Bits | Format |
|---|---|---|
| dcc_selection_id { | | |
|     reserved | 40 | 0xFFFFFFFFFF |
|     location_code { | | |
|         state_code | 8 | uimsbf range 0..99 |
|         county_subdivision | 4 | uimsbf range 0..9 |
|         reserved | 2 | '11' |
|         county_code | 10 | uimsbf range 0..999 |
|     } | | |
| } | | |

FIG. 6A

<Bit Stream Syntax for the DCC Departing Request Descriptor>

| Syntax | Bits | Format |
|---|---|---|
| dcc_departing_request_descriptor() { | | |
|     descriptor_tag | 8 | 0xA8 |
|     descriptor_length | 8 | uimsbf |
|     dcc_departing_request_type | 8 | uimsbf |
|     dcc_departing_request_text_length | 8 | uimsbf |
|     dcc_departing_request_text() | var | |
| } | | |

FIG. 6B

<DDC Departing Request Type Assignments>

| Value | Meaning |
|---|---|
| 0x00 | Reserved |
| 0x01 | Cancel any outstranding departing request type and immediately perform a channel change upon request by the viewer. |
| *0x02 | Display departing request text in a centered window for a minimum of 10 seconds prior to performing the channel change requested by the viewer or for a lesser amount of time if the viewer issues another channel change request or a "continue","OK","proceed", or equivalent command. |
| *0x03 | Display departing request text in a centered window indefinitely until viewer issues another channel change request or a "continue","OK","proceed", or equivalent command. |
| 0x04-0xFF | Reserved |

FIG. 7A

<Bit Stream Syntax for the DCC Arriving Request Descriptor>

| Syntax | Bits | Format |
|---|---|---|
| dcc_arriving_request_descriptor() { | | |
|     descriptor_tag | 8 | 0xA9 |
|     descriptor_length | 8 | uimsbf |
|     dcc_arriving_request_type | 8 | uimsbf |
|     dcc_arriving_request_text_length | 8 | uimsbf |
|     dcc_arriving_request_text() | var | |
| } | | |

FIG. 7B

<DCC Arriving Request Type Assignments>

| Value | Meaning |
|---|---|
| 0x00 | Reserved |
| 0x01* | Display arriving request text in a centered window for a minimum of 10 seconds after performing the channel change requested by the viewer, or for a less amount of time if the viewer issues a a "continue","OK","proceed", or equivalent command. |
| 0x02* | Display arriving request text in a centered window indefinitely after performing a channel change request requested by the viewer until viewer issues a "continue","OK","proceed",or equivalent command. |
| 0x03-0xFF | Reserved |

EMERGENCY ALERT SIGNALING METHOD AND DIGITAL TELEVISION RECEIVER

This application claims the benefit of Korean Patent Application No. 10-2005-0107078, filed on Nov. 9, 2005, which is hereby incorporated by reference.

BACKGROUND OF THE INVENTION

1. Field of the Invention

The present invention relates to an emergency alert signaling method and a digital television receiver.

2. Discussion of the Related Art

Recently, natural disasters including an unexpected earthquake, a flood and the like or emergency situations including a terror, incendiarism and the like are frequently take place. Moreover, damages caused by the natural disaster due to an environmental pollution or by the terror are widely expanded and their spreading effects get more powerful.

In case that the above-illustrated emergency takes place, a terrestrial broadcasting station collects data of the emergency, adjusts the collected data and then sends news relating to the emergency in a format of a newsflash or the like after duration.

In case that the emergency takes place, almost every broadcasting station transmits the newsflash to provide broadcast news associated with the emergency to viewers.

However, in operating the emergency alert system in the above-explained broadcasting, the related art method has the following problems.

First of all, all channels of the broadcasting simultaneously broadcast the almost similar newsflashes. Hence, it is undesirable in aspect of the efficient management of broadcast channels.

Secondly, in case that the emergency has occurred, a new table should be added within the PSIP (program and system information protocol) to provide information associated with the emergency to viewers collectively.

SUMMARY OF THE INVENTION

Accordingly, the present invention is directed to an emergency alert signaling method and a digital television receiver that substantially obviate one or more problems due to limitations and disadvantages of the related art.

An object of the present invention is to provide a method of managing an emergency alert system using a direct channel change (DCC) function in digital broadcasting, data structure thereof and broadcast receiver thereof, by which broadcast channels can be efficiently used instead of using the entire broadcast channels to broadcast news associated with an emergency.

Another object of the present invention is to provide a method of managing an emergency alert system using a direct channel change (DCC) function in digital broadcasting, data structure thereof and broadcast receiver thereof, by which news about an emergency can be quickly and accurately notifies to viewers without adding a separate table within a PSIP to provide information associated with the emergency to the viewers in case of an emergency occurrence.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terrestrial digital television (DTV) receiver includes a tuner, a demodulator, a demultiplexer, a decoder, and a controller. The tuner receives a digital television signal which includes a direct channel change table (DCCT) from a broadcast transmitter. The demultiplexer then demultiplexes the DCCT from the demodulated television signal. The decoder parses channel ID information and a priority code from the demultiplexed DCCT. The channel ID information specifies an emergency alert channel associated with an emergency alert event and the priority code specifies an alert priority of the emergency alert event. The controller controls operation of the tuner to automatically tune to the emergency alert channel based upon the alert priority. For example, if the alert priority is maximum high, the controller generates a control signal to the tuner in order to tune to the emergency alert channel. On the other hand, if the alert priority is low, the controller may not generate such control signal to the tuner.

In another aspect of the present invention, a terrestrial digital television (DTV) receiver includes a tuner, a demodulator, a demultiplexer, a decoder, and a controller. The tuner receives a digital television signal including a direct channel change table (DCCT) and a direct channel change selection code table (DCCSCT) from a broadcast transmitter. The demodulator then demodulates the digital television signal and the demultiplexer demultiplexxes the DCCT and the DCCSCT from the demodulated television signal. The decoder parses channel ID information from the DCCT and further parses a priority code from the DCCSCT. The channel ID information specifies an emergency alert channel associated with an emergency alert event, and the priority code specifies an alert priority of the emergency alert event. The controller controls operation of the tuner to automatically tune to the emergency alert channel based upon the alert priority.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is an exemplary diagram of a bit stream syntax of a direct channel change table (DCCT) according to the present invention;

FIG. 2 is an exemplary diagram of a bit stream syntax of a direct channel change selection code table (DCCSCT) according to the present invention;

FIG. 3 is an exemplary diagram of an extension table of DCC selection type assignments according to the present invention;

FIG. 4A is an exemplary diagram of a table defining alert priority codes of emergency according to the present invention;

FIG. 4B is an exemplary diagram of a table defining EAS (emergency alert system) originator codes according to the present invention;

FIG. 4C is an exemplary diagram of a table defining EAS (emergency alert system) event codes according to the present invention;

FIG. 5A is an exemplary diagram of a code packing method of "dcc_selection_id" field within DCCT according to the present invention;

FIG. 5B is an exemplary diagram of a table associated with a value of "update_type" field within DCCT according to the present invention;

FIG. 5C is an exemplary diagram of a table associated with values of "EAS_category_code" and "EAS_category_name_text( )" field within DCCT according to the present invention;

FIG. 5D is another exemplary diagram of an extension table of DCC selection type assignments according to the present invention;

FIG. 5E is a further exemplary diagram of an extension table of DCC selection type assignments according to the present invention;

FIG. 5F is an exemplary diagram of "dcc_selection_id" including "location_code" according to the present invention;

FIG. 6A is an exemplary diagram of a table associated with a value of "dcc_test_descriptor" field within DCCT (in case that the "dcc_test_descriptor" field is "DCC_Departing_Request_Descriptor") according to the present invention;

FIG. 6B is an exemplary diagram of another table associated with a value of "dcc_test_descriptor" field within DCCT (in case that the "dcc_test_descriptor" field is "DCC_Departing_Request_Descriptor") according to the present invention;

FIG. 7A is an exemplary diagram of a table associated with a value of "dcc_test_descriptor" field within DCCT (in case that the "dcc_test_descriptor" field is "DCC_arriving_Request_Descriptor") according to the present invention;

FIG. 7B is an exemplary diagram of another table associated with a value of "dcc_test_descriptor" field within DCCT (in case that the "dcc_test_descriptor" field is "DCC_arriving_Request_Descriptor") according to the present invention;

DETAILED DESCRIPTION OF THE INVENTION

Figure 8:
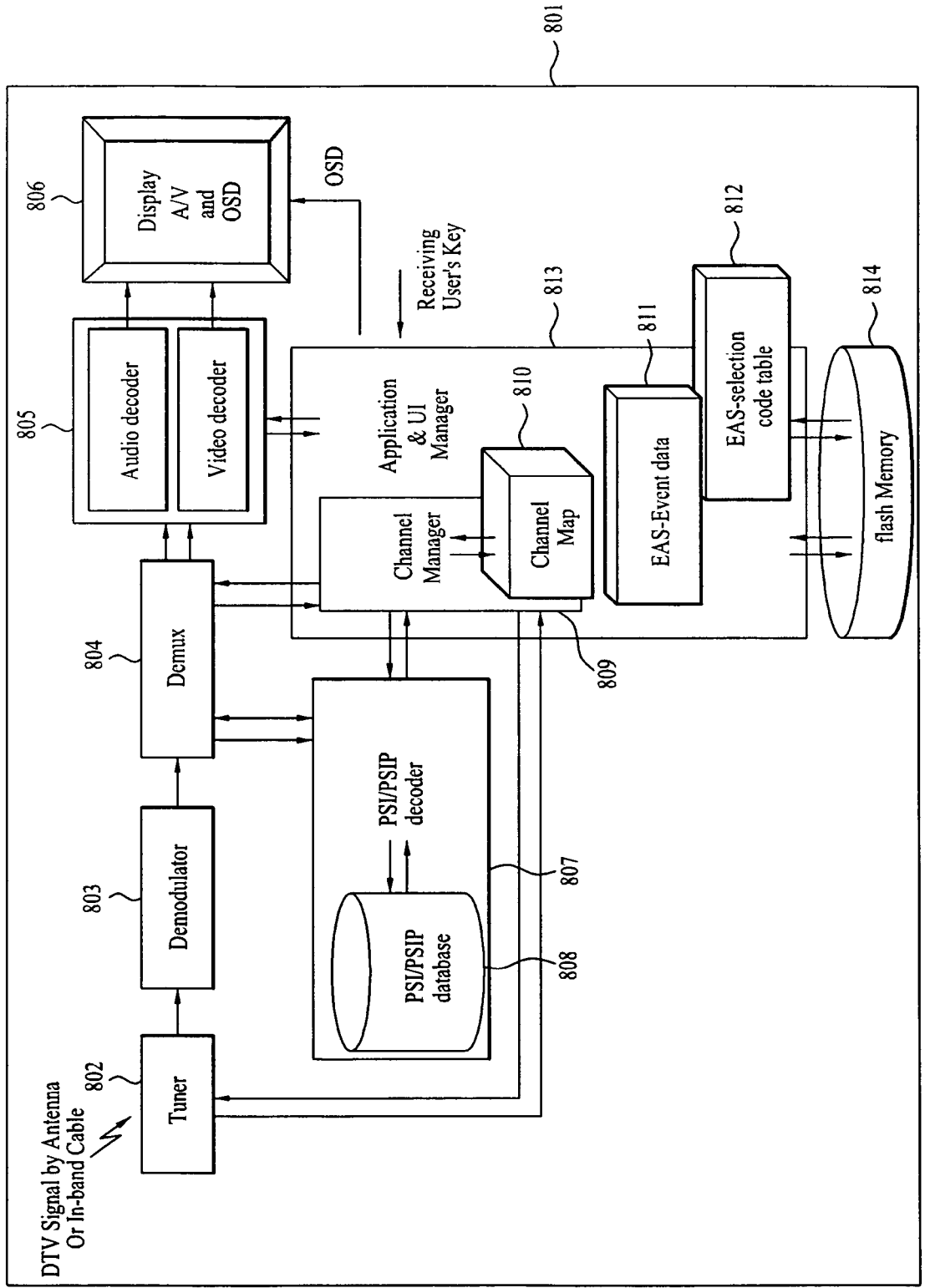
FIG. 8 is a block diagram of a broadcast receiver capable of managing an emergency alert system using a DCC function in digital broadcasting according to the present invention.

Reference will now be made in detail to the preferred embodiments of the present invention, examples of which are illustrated in the accompanying drawings. Wherever possible, the same reference numbers will be used throughout the drawings to refer to the same or like parts.

First of all, the present invention relates to a system capable of receiving an emergency alert message and tuning to an emergency alert channel using DCCT (direct channel change table) and DCCSCT (direct channel change selection code table) associated with a channel change function attributed to agreement between a broadcasting station following PSIP (program and system information protocol) of the digital broadcast standard and a digital television capable of receiving PSIP data.

The PSIP is the specification of ATSC (advanced television systems committee) for terrestrial and cable digital broadcasting. The PSIP is defined to provide various information for programs by parsing messages encoded by MPEG-2 (moving picture experts group: ISO/IEC 13818-1 system) and the like.

The PSIP includes a virtual channel table (VCT), a table associated with time information (system time table: STT), a table for transferring information about a region and deliberate council associated with a program rating and the like (rating region table: RRT), a table associated with appended explanation for channels and broadcast programs (extended text table: ETT), a table associated with auto channel change (direct channel change table: DCCT or direct channel change selection code table: DCCSCT), a table associated with managements of table versions and packet identifiers (PIDs) of tables (master guide table: MGT), and the like.

Meanwhile, the DCC (direct channel change) function is a function of changing a channel manually or automatically by protocol and conditions compromised between a digital broadcasting station and a receiver capable of receiving digital broadcasting.

The DCC function is defined in each of the associated tables such as DCCT, DCCST and the like.

In the present invention, the DCCT or the like is modified or extended to be used as an EAS (emergency alert system) by defining or adding new fields of the DCCT (direct channel change table) in part.

In the present invention, priority, event type code, originator code and the like of an emergency associated with the EAS are defined by defining or adding new fields of the DCCSCT (direct channel change selection code table) in part.

Hence, a receiver capable of receiving digital broadcasting can represent an emergency alert message on a display by parsing DCCT and DCCST containing information associated with the EAS in the course of digital broadcasting or can be tuned to an emergency alert channel together with the display.

For the clear explanation, 'description for a method of identifying a table containing information of an emergency occurrence', 'description for a method of tuning to an emergency alert channel in case of an emergency occurrence', 'description for a method of displaying a channel number', 'description about a tuning and display time', 'description about a condition for a tuning to an emergency alert channel', 'description of a method of defining an organization generating an emergency alert', 'description of a method of displaying and controlling an emergency alert message', and 'description of a method that a digital broadcast receiver receives DCCT, DCCSCT and the like to process an emergency alert message (EAM) and to be tuned to an emergency alert channel' are respectively explained as follows.

First Embodiment

FIG. 1 is an exemplary diagram of a bit stream syntax of a direct channel change table (DCCT) according to the present invention. A method of including information, which indicates that DCCT can be used as a table associated with an emergency alert system, in the DCCT is explained with reference to FIG. 1 as follows.

For instance, in using a DCCT for an EAS (emergency alert system), a specific value (e.g., 0Xea, etc.) is assigned to "dcc_id" field within the DCCT.

Of course, it is able to design a separate field, which includes information indicating that the DCCT is used as an EAS, to be added to the DCCT.

In case that the "dcc_id" field is assigned to have a specific value, the DCCT is defined to be used for an emergency alert system event (EAS-event) by the "Dcc_id" field.

Second Embodiment

FIG. 1 is an exemplary diagram of a bit stream syntax of a direct channel change table (DCCT) according to the present invention. A method of tuning to an emergency alert channel in case of an emergency occurrence, a channel number displaying method, and the tuning and display time are explained with reference to FIG. 1 as follows.

In this case, the emergency alert channel can select one of previously existing broadcast channels to use or can use a new channel of a newly granted frequency for broadcasting information about an emergency only.

For instance, an EAS (emergency alert system) according to a second embodiment of the present invention is implemented using "dcc_context", "dcc_from_major_channel_number", "dcc_from_minor_channel_number", "dcc_to_major_channel_number", "dcc_to_minor_channel_number", "dcc_start_time", "dcc_end_time", and "dcc_term_count" fields previously existing within DCCT. It is a matter of course that DCCT can be designed by adding new fields to the DCCT instead of using the previously existing fields.

The "dcc_context" field is used as "EAS_context". For instance, if the "dcc_context" field is constructed with one bit, 'temporary retune' or 'channel redirect' function is implemented according to a value of the field.

For instance, if the value of the field is '0', the 'temporary retune' function is implemented. The 'temporary retune' function means a function of tuning a broadcast receiver having received information of an emergency occurrence to an emergency alert channel by displaying an emergency alert channel number to enabling a user to confirm the displayed channel number instead of tuning the broadcast receiver to the emergency alert channel directly.

This is the function to solve a problem that a broadcast image currently viewed by a user instantly disappears.

If the value of the field is '1', the 'channel redirect' function is implemented. By the 'channel retune' function, a broadcast receiver having received information of an emergency occurrence is directly tuned to an emergency alert channel.

This is the function to provide a user with information associated with an emergency more quickly if the emergency is relatively urgent and important.

The "dcc_from_major_channel_number" field is used as a syntax representing a major channel number among terrestrial or cable virtual channels. For instance, the "dcc_from_major_channel_number" field is constructed with ten bits and has a field value between 1~999.

In particular, the "dcc_from_major_channel_number" field means a major channel number prior to a tuning to an emergency alert channel in case that an emergency alert channel tuning occurs.

The "dcc_from_major_channel_number" field is to return to an original channel having been viewed by a user if an associated broadcast over the emergency alert channel ends or if a predetermined duration expires. And, the "dcc_from_major_channel_number" field can be used in displaying the original manor channel number to a user.

The "dcc_from_minor_channel_number" field is used as a syntax representing a minor channel number among terrestrial or cable virtual channels. For instance, the "dcc_from_minor_channel_number" field is constructed with ten bits and has a field value between 1~999.

In particular, the "dcc_from_minor_channel_number" field means a minor channel number prior to a tuning to an emergency alert channel in case that an emergency alert channel tuning occurs.

The "dcc_from_minor_channel_number" field is to return to an original channel having been viewed by a user if an associated broadcast over the emergency alert channel ends or if a predetermined duration expires. And, the "dcc_from_minor_channel_number" field can be used in displaying the original manor channel number to a user.

Meanwhile, the "dcc_to_major_channel_number" field is used as a syntax representing a major channel number among terrestrial or cable virtual channels. For instance, the "dcc_to_major_channel_number" field is constructed with ten bits and has a field value between 1~999.

In particular, the "dcc_to_major_channel_number" field is a field for a tuning to an emergency alert channel in case that an emergency alert channel tuning occurs. For instance, the "dcc_to_major_channel_number" field indicates a major channel number of the emergency alert channel. And, the "dcc_to_major_channel_number" field can be used in displaying the major channel number of the emergency alert channel to a user.

The "dcc_to_minor_channel_number" field is used as a syntax representing a minor channel number among terrestrial or cable virtual channels. For instance, the "dcc_to_minor_channel_number" field is constructed with ten bits and has a field value between 1~999.

In particular, the "dcc_to_minor_channel_number" field is a field for a tuning to an emergency alert channel in case that an emergency alert channel tuning occurs. For instance, the "dcc_to_minor_channel_number" field indicates a minor channel number of the emergency alert channel. And, the "dcc_to_minor_channel_number" field can be used in displaying the minor channel number of the emergency alert channel to a user.

The "dcc_start_time", "dcc_end_time" and "dcc_term_count" fields are syntaxes used in indicating a start time and end time of 'EAS-event'. In particular, by the "dcc_start_time", "dcc_end_time" and "dcc_term_count" fields, such an function of an emergency alert system as a channel change, a message display and the like is implemented to operate according to a specific schedule.

For instance, a value of the "dcc_start_time" field is used in displaying a start time of a tuning to an emergency alert channel, a display start time of an emergency alert channel number or the like.

And, a value of the "dcc_end_time" field is used in displaying an end time of a tuning to an emergency alert channel, a display end time of the emergency alert channel number or the like.

Of course, by considering setter's intention, user's convenience and the like, the "dcc_start_time", "dcc_end_time" and "dcc_term_count" fields can be used as fields representing a start time and end time of another specific content.

Third Embodiment

FIG. 1 is an exemplary diagram of a bit stream syntax of a direct channel change table (DCCT) according to the present invention.

FIG. 3 is an exemplary diagram of an extension table of DCC selection type assignments according to the present invention.

FIG. 4A is an exemplary diagram of a table defining alert priority codes of emergency according to the present invention.

FIG. 4B is an exemplary diagram of a table defining EAS (emergency alert system) originator codes according to the present invention.

FIG. 4C is an exemplary diagram of a table defining EAS (emergency alert system) event codes according to the present invention.

Conditions of a tuning to an emergency alert channel are explained with reference to FIG. 1, FIG. 3 and FIGS. 4A to 4C as follows.

In case that a DCCT is defined to be used as an emergency alert test, a value of "dcc_selection_type" field shown in FIG. 1 is used as a value representing various conditions for a tuning to an emergency alert channel.

And, the "dcc_selection_type" field can be combined with "dcc_selection_id" filed shown in FIG. 1 to suppose various conditions for the tuning to the emergency alert channel.

The "dcc_selection_type" field is used in defining a type of a field value included in the "dcc_selection_id" filed. The "dcc_selection_type" field can be defined by eight bits for example.

In particular, regarding the present invention, if a DCC-request existing within the DCCT is used for an EAS, a value of the "dcc_selection_type" field is set to a specific value (e.g., 0xEA, etc.). In this case, the DCC-request indicates that information (EAS_event_code) associated with an emergency is transferred via the "dcc_selection_type" field.

Yet, in the first embodiment of the present invention, the "dcc_id" field is declared as an event of an emergency alert system (EAS-event), which means an entire DCCT table is used for the emergency alert system.

Meanwhile, in the third embodiment of the present invention, the "dcc_selection_type" field is declared as an event of an emergency alert system (EAS-event). A plurality of DCC-requests can exist within the DCCT. Hence, the DCC-request within the declared range within a for-loop shown in FIG. 1 can be used for the event of the emergency alert system (EAS-event).

A table, as shown in FIG. 3, associated with the "dcc_selection_type" field is extended more than that of the related art.

Referring to FIG. 3, if a value of DCC Selection Type is '0xEA', a "dcc_selection_type" field contains information about EAS priority codes, EAS originator codes and EAS event codes.

Conditions for a tuning to an emergency channel are defined as FIGS. 4A to 4C. Yet, meanings and values shown in FIGS. 4A to 4C are just exemplary but do not put limitation on claims of the present invention.

Meanwhile, tables shown in FIGS. 4A to 4C can be unified into one to be implemented if necessary.

Referring to FIG. 4A, a digital broadcast receiver having received information about an emergency occurrence can be set to instantly activate a tuning to an emergency alert channel or to activate a tuning to an emergency alert channel in case of a specific event only according to an urgent or significant extent of an emergency.

Whether to provide the information of the emergency occurrence to a user with an audio output is defined by the table shown in FIG. 4A.

FIG. 4B shows a table indicating what originator generates and notifies information of an emergency occurrence to a user. For instance, the originator may correspond to Central Government, National Weather Service, terrestrial broadcasting station, cable broadcasting station or the like.

FIG. 4C is a table regulating a detailed type and character of an emergency. In some cases, the emergency, as shown in FIG. 4C, can be defined according to National codes and Local Codes.

Yet, as a condition of a tuning to an emergency alert channel, information about EAS Priority Codes, EAS Originator Codes and EAS Event Codes is defined by DCCSCT. A digital broadcast receiver is operated according to a value of "dcc_selection_id", which is explained in a fourth embodiment of the present invention.

Fourth Embodiment

FIG. 1 is an exemplary diagram of a bit stream syntax of a direct channel change table (DCCT) according to the present invention.

FIG. 2 is an exemplary diagram of a bit stream syntax of a direct channel change selection code table (DCCSCT) according to the present invention.

FIG. 5A is an exemplary diagram of a code packing method of "dcc_selection_id" field within DCCT according to the present invention.

FIG. 5B is an exemplary diagram of a table associated with a value of "update_type" field within DCCT according to the present invention.

FIG. 5C is an exemplary diagram of a table associated with values of "EAS_category_code" and "EAS_category_name_text( )" field within DCCT according to the present invention.

A method of parsing information about emergency priority, emergency type and emergency alert originator using DCCT and DCCSCT is explained with reference to FIG. 1, FIG. 2 and FIGS. 5A to 5C as follows.

Information for managing an emergency alert system test, e.g., values of EAS Priority Codes, EAS Originator Codes and EAS Event Codes associated with channel tuning conditions and the like are defined by DCCSCT shown in FIG. 2.

A digital broadcast receiver receives the DCCSCT to store in its memory, and receives a value of "dcc_selection_id" field of DCCT shown in FIG. 1 to control an emergency alert system.

For instance, if the value of the "dcc_selection_id" field shown in FIG. 1 is '0Xea', it can be recognized that information of an emergency occurrence is received (cf. Third Embodiment).

If the value of the "dcc_selection_id" field shown in FIG. 1 is '0X00 00 00 00 00 9E 52 0B', it can be recognized that an emergency of Hurricane Watch, National Weather Service and High Priority has occurred.

This is because last three bytes of the "dcc_selection_id" field, a shown in FIG. 3, are defined as EAS Priority Codes, EAS Originator Codes and EAS Event Codes.

If the value of the "dcc_selection_id" field is '0X00 00 00 00 00 9E 52 0B', the emergency of Hurricane Watch, National Weather Service and High Priority can be understood with reference to the tables of FIGS. 4A to 4C.

Yet, values of the EAS Priority Codes, EAS Originator Codes and EAS Event Codes are defined by the DCCSCT shown in FIG. 2.

The present invention, as shown in FIG. 2, differs from the related art in defining a new value of "update_type" field and adding "EAS_category_code" and "EAS_category_name_text( )" fields.

For instance, if a value of the "update_type" field, as shown in FIG. 5B, is '0x04', it is assigned to enable a decision that a category associated with a new emergency alert system (new_EAS_category) is received. Hence, it can be decided that a table associated with an emergency alert system is updated.

Of course, the numeral value does not put limitation of claims of the present invention but is just exemplary.

Meanwhile, in case that a value of the "update_type" field is '0x04', a corresponding conditional sentence is the conditional sentence of "if(update_type==new_EAS_category)" shown in FIG. 2 (cf. FIG. 5B). Hence, a syntax below the conditional sentence is decided.

For instance, as shown in FIG. 5C, a value of "EAS_category_code" field can have '0x9E' and "EAS_category_name_text( )" field can represent Hurricane Watch (cf. FIG. 5A).

Although FIG. 5C includes information about EAS Event Codes, it is able to design a syntax below the conditional sentence "if(update_type==new_EAS_category)" to include at least one information of EAS Priority Codes, EAS Originator Codes and EAS Event Codes if necessary.

Fifth Embodiment

FIG. 1 is an exemplary diagram of a bit stream syntax of a direct channel change table (DCCT) according to the present invention.

FIG. 3 is an exemplary diagram of an extension table of DCC selection type assignments according to the present invention.

FIG. 5D is another exemplary diagram of an extension table of DCC selection type assignments according to the present invention.

FIG. 5E is a further exemplary diagram of an extension table of DCC selection type assignments according to the present invention.

FIG. 5F is an exemplary diagram of "dcc_selection_id" including "location_code" according to the present invention.

A method of defining information about an emergency associated location code ("location_code") as well as information for EAS Priority Codes, EAS Originator Codes and EAS Event Codes as the aforesaid EAS managing conditions described in the third and fourth embodiment of the present invention is explained with reference to FIG. 1, FIG. 3 and FIGS. 5D to 5F as follows.

The method of defining the emergency associated region can be taken into consideration in the following to manners.

First of all, if 'DCC-request' is singular, and more particularly, if "dcc_selection_type" is '0xEA', four of eight bytes of "dcc_selection_id" include information about EAS Priority Codes, EAS Originator Codes, EAS Event Codes and Location Codes.

In particular, the fifth embodiment of the present invention, as shown in FIG. 5D, differs from the third or fourth embodiment of the present invention in using conventional "location-code" for EAS management by adding the "location_code" or in defining new "location_code".

Secondly, if 'DCC-request' is plural, "dcc_selection_type" can have various values, which is used to suppose various EAS conditions.

For instance, if "dcc_selection_type" is '0xEA', three of eight bytes of "dcc_selection_id" include information about EAS Priority Codes, EAS Originator Codes, EAS Event Codes as it is.

The EAS managing conditions of the location associated with the emergency can be defined without defining Location Codes within "dcc_selection_id" directly, which differs from the first method.

Yet, the second method differs from the first method in supposing the "dcc_selection_type" having various values, which uses the fact that at least two 'DCC-request' cannot exist.

Meanwhile, in case that another "dcc_selection_type" is '0x0C' (Geographic Location Inclusion), a tuning to an emergency alert channel or the like is set to take place if a geographic location of a digital broadcast receiver does not correspond to a location code of "dcc_selection_type".

The "dcc_selection_type", as shown in FIG. 5F, includes information indicating what state is affected by an emergency occurrence and information indicating what county is affected by the emergency occurrence. Of course, the location units are exemplarily shown as state and county but can include country code ("country_code") as well.

And, the location units follows U.S. systems but can be set to administrative district units according to each country as well.

In outputting an emergency alert message using the emergency occurrence location code ("location_code"), a name of the emergency occurrence location can be displayed in detail.

Optionally, a digital broadcast receiver, which is placed in an area not included in the emergency occurrence location, is set not to be tuned to an emergency alert channel. This is because the digital broadcast receiver of a user located at an area having no relation to a previously occurring emergency almost needs not to be tuned to emergency alert channel.

Of curse, regardless of a location of the digital broadcast receiver, in case of an emergency occurrence, the digital broadcast receiver can be set to be tuned to the emergency alert channel as well.

Sixth Embodiment

FIG. 1 is an exemplary diagram of a bit stream syntax of a direct channel change table (DCCT) according to the present invention.

FIG. 6A is an exemplary diagram of a table associated with a value of "dcc_test_descriptor" field within DCCT (in case that the "dcc_test_descriptor" field is "DCC_Departing_Request_Descriptor") according to the present invention.

FIG. 6B is an exemplary diagram of another table associated with a value of "dcc_test_descriptor" field within DCCT (in case that the "dcc_test_descriptor" field is "DCC_Departing_Request_Descriptor") according to the present invention.

FIG. 7A is an exemplary diagram of a table associated with a value of "dcc_test_descriptor" field within DCCT (in case that the "dcc_test_descriptor" field is "DCC_arriving_Request_Descriptor") according to the present invention.

FIG. 7B is an exemplary diagram of another table associated with a value of "dcc_test_descriptor" field within DCCT (in case that the "dcc_test_descriptor" field is "DCC_arriving_Request_Descriptor") according to the present invention.

A method of displaying and control an emergency alert message is explained in detail with reference to FIG. 1 and FIGS. 6A to 7B as follows.

An emergency alert message is outputted and controlled using "dcc_test_descriptor( )" of DCCT shown in FIG. 1.

For instance, the "dcc_test_descriptor( )" field of FIG. 1 can be used as "dcc_departing_request_descriptor" shown in FIG. 6A, of which examples are shown in FIG. 6A and FIG. 6B.

Namely, in case that the "dcc_test_descriptor( )" field is used as the "dcc_departing_request_descriptor" field, if a value of "dcc_departing_request_type" field is '0x01' for example, any request text for a channel tuning to an emergency alert channel is not displayed but is immediately tuned to the emergency alert channel according to a request made by a user (cf. FIG. 6B).

If a value of "dcc_departing_request_type" field is '0x02' for example, a request text for a channel tuning to an emergency alert channel is displayed during at least ten seconds prior to a tuning to an emergency alert channel according to a request made by a user (cf. FIG. 6B).

If a value of "dcc_departing_request_type" field is '0x03' for example, a tuning to another channel is requested or a request text for a channel tuning to an emergency alert channel is displayed until an input request of "continue", "OK" or the like is made (cf. FIG. 6B).

The operations according to the "dcc_departing_request_type" field values are just exemplary but can be modified into different forms by considering user's situations. Hence, detailed modifications of the operations belong to claims of the present invention.

Meanwhile, the "dcc_test_descriptor( )" field of FIG. 1 can be used as "dcc_arriving request_descriptor", of which examples are shown in FIG. 7A and FIG. 7B.

In case that the "dcc_test_descriptor( )" field is used as "dcc_arriving request descriptor", if a value of "dcc_arriving_request_type" field of FIG. 7A is '0x01' for example, any request text for a channel tuning to an emergency alert channel is displayed during at least ten seconds after a tuning to an emergency alert channel according to a request made by a user (cf. FIG. 7B).

If a value of "dcc_arriving_request_type" field of FIG. 7A is '0x02' for example, a text indicating a completed tuning to an emergency alert channel keeps being displayed according to a user's request until a command for "continue" or "OK" or an equivalent command is inputted by a user (cf. FIG. 7B).

The operations according to the "dcc_departing_request_type" field values are just exemplary but can be modified into different forms by considering user's situations. Hence, detailed modifications of the operations belong to claims of the present invention.

Seventh Embodiment

FIG. 8 is a block diagram of a broadcast receiver capable of managing an emergency alert system using a DCC function in digital broadcasting according to the present invention.

A broadcast receiver capable of managing an emergency alert system using a DCC function in digital broadcasting according to the present invention implements the aforesaid first to sixth embodiments of the present invention, which is explained with reference to FIG. 8 as follows.

Referring to FIG. 8, a broadcast receiver 801 according to the present invention includes a tuner 802, a demodulator 803, a demultiplexer 804, an A/V decoder 805, a display unit 806, a PSI/PSIP decoder 807, a PSI/PSIP database 808, a channel manager 809, a channel map 810, an application & UI manager 813, a flash memory 814 and the like.

And, the digital broadcast receiver 801 includes a DTV (digital television) capable of receiving digital broadcasting via an antenna or an in-band cable.

The tuner 802 receives terrestrial or cable broadcast signals.

The demodulator 803 demodulates a broadcast signal, and more particularly, a digital broadcast signal received via the tuner 802 into a VSB (vestigial sideband) or QAM (quadrature amplitude modulation) signal and then transfers the VSB or QAM signal to the demultiplexer in a transport stream format.

The demultiplexer 804 demultiplexes the transferred transport stream formatted signal to transfer to the A/V decoder 805, the PSI/PSIP decoder 807 or the application & UI manager 813.

The A/V decoder 805 decodes A/V data of the transport stream demultiplexed by the demultiplexer 804 by MPEG2, AC3 or the like.

The display unit 806 synchronizes to output the decoded A/V data by a VDP (video display processor) (not shown in the drawing).

And, the display unit 806 outputs the audio or video data and OSD (on screen display) video.

The PSI/PSIP decoder 807 controls a channel associated information table obtained from the demultiplexer 804 to transfer an A/V PID (audio/video packet ID) list to the channel manager 809.

The channel manager 809 can make a request for receiving the channel associated information table to the PSI/PSIP decoder 807 with reference to the channel map 810 and then receives a response result in response to the request.

And, the channel manager 809 controls a channel tuning of the tuner 802.

Moreover, the channel manager 809 can control the A/V decoder 805 in a manner of directly controlling the demultiplexer 804 to set an A/V PID by itself.

And, the application & UI manager 813 checks and controls states of the A/V decoder 805, the VDP (not shown in the drawing) and the like overall. Meanwhile, the application & UI manager 813 controls the digital broadcast receiver 801 by receiving user's key input signal and controls a state of the digital broadcast receiver 801 to be outputted in an OSD (on screen display) form via the display unit 806.

In particular, a signal flow implementing each of the aforesaid first to sixth embodiments of the present invention by means of the elements of the digital broadcast receiver according to the seventh embodiment of the present invention is explained in detail as follows.

First of all, a specific value of "dcc_id" field of DCCT is defined to be used as EA-Test. Namely, in case that a value of "dcc_id" field of DCCT received by the digital broadcast receiver 801 includes information indicating that the DCCT is used as a table associated with an emergency alert system, the demultiplexer 804 parses the information indicating that the DCCT is the table associated with an emergency alert system in a demultiplexing step (cf. First Embodiment).

Of course, the demultiplexer 804 can parse a field value of DCCSCT as well.

In case that the DCCT or DCCST is defined to be used for an emergency alert test (EA-Test), the PSI/PSIP decoder 807 parses field contents of the DCCT or DCCSCT and stores the DCCT or DCCSCT in the PSI/PSIP database 808.

The channel manager 809 controls the tuner 802 using "dcc_context" field of the DCCT among information decoded by the PSI/PSIP decoder 807.

For instance, the channel manager 809 controls the tune 802 to be tuned to an emergency alert channel. And, the application & UI manager 813 controls a method of displaying an emergency alert channel number and the like by controlling the display unit 806.

In particular, the channel manager 809 controls an emergency alert channel number, a currently tuned channel number and the like using "dcc_from_major_channel_number", "dcc_from_minor_channel_number", "dcc_to_major_channel_number", "dcc_to_minor_channel_number", and the like in the DCCT.

Meanwhile, the application & UI manager 813 controls a managing time of EA-Test using "dcc_start_time", "dcc_end_time" and the like (cf. Second Embodiment).

Besides, the channel manager 809 checks information about an emergency alert channel for a tuning using the channel map 810. And, the channel map 810 configures a new channel map associated with an emergency alert channel with reference to emergency alert system managing data (EAS-Event data) obtained from an EAS channel tuning associated table (EAS-selection code table) 812.

Meanwhile, a specific value of "dcc_selection_type" field is defined to be used for EA-Test for example.

Namely, in case that a value of "dcc_selection_type" field of DCCT received by the digital broadcast receiver 801 includes information indicating that the DCCT is used as a table associated with an emergency alert system, the demultiplexer 804 can parse the information indicating that the DCCT is the table associated with an emergency alert system in a demultiplexing step.

Furthermore, by combining values of "dcc_selection_id" and "dcc_selection_type" fields of the DCCT together, various conditions associated with an emergency alert channel tuning and an emergency alert message output are generated (cf. Third Embodiment).

In doing so, the PSI/PSIP decoder 807 takes charge of parsing the fields. The channel manager 809 controls the channel tuning and the application & UI manager 813 controls an EAM (emergency alert message) to be outputted via the display unit 806, according to the parsed field values.

In case that the DCCT or DCCST is defined to be used for an emergency alert test (EA-Test), code values associated with EAS Priority Codes, EAS Originator Codes and EAS Event codes to manage the EA-Test are defined by the DCCSCT in detail to be transferred to the digital broadcast receiver 801 (cf. Third Embodiment and Fourth Embodiment).

In this case, the demultiplexer 804 demultiplexes the DCCSCT and the PSI/PSIP decoder 807 stores the DCCSCT in the PSI/PSIP database 808.

The demultiplexer 804 demultiplexes the DCCT and the PSI/PSIP decoder 807 parses a variation of a value of "dcc_selection_id" of the DCCT.

In doing so, if the variation of a value of "dcc_selection_id" is parsed, an EAS (emergency alert system) is managed using "update_type", "EAS_category_code" and "EAS_category_name_text( )" fields included in the DCCSCT (cf. Fourth Embodiment and Fifth Embodiment).

Meanwhile, the PSI/PSIP decoder 807 parses a value of "dcc_test_descriptor( )" field in the DCCT demultiplexed by the demultiplexer 804 and then transfers the parsed information to the application & UI manager 813. And, the application & UI manager 813 controls a method of outputting an emergency alert message via the display unit 806 according to the information (cf. Sixth Embodiment).

Eighth Embodiment

Figure 9:
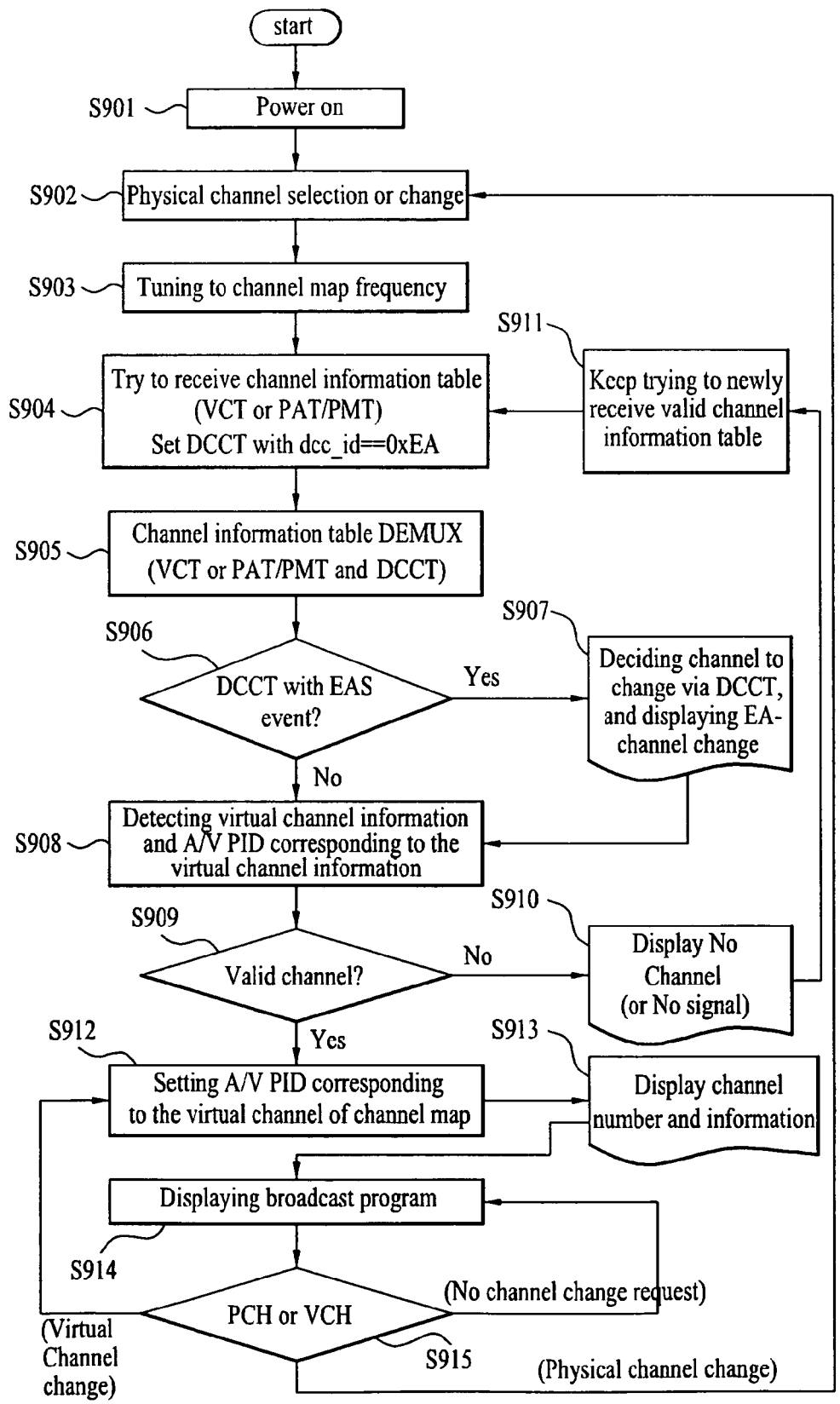
FIG. 9 is a flowchart of a method of managing an emergency alert system using a DCC function in digital broadcasting according to the present invention.

FIG. 9 is a flowchart of a method of managing an emergency alert system using a DCC function in digital broadcasting according to the present invention.

A method of managing an emergency alert system using a DCC function in digital broadcasting according to the present invention is explained with reference to FIG. 9 as follows.

First of all, a power of a digital broadcast receiver 801 is turned on (S901). And, a specific physical channel is selected via a key input unit of the digital broadcast receiver 801 (S902). And, it is a matter of course that the physical channel can be changed if necessary.

The digital broadcast receiver 801 is tuned to a frequency corresponding to the selected or changed physical channel using a channel map 810 (S903).

A tables associated with channel information is received by the physical channel of the tuned frequency (S904). For instance, the table associated with the channel information includes VCT(Virtual Channel Table), PAT(Program Association Table)/PMT(Program Map Table), DCCT(Direct Channel Change Table), DCCSCT(Direct Channel Change Selection Code Table) and the like. In particular, if a value of "dcc_id" field of the DCCT is '0xEA', the DCCT is defined to be used as a table associated with an emergency alert system.

The channel information associated tables, VCT, PAT/PMT, DCCT and DSSCST are demultiplexed (S905).

It is decided whether the demultiplexed DCCT includes information associated with the emergency alert system (S906).

For instance, the decision can be made using a specific field of the DCCT. The specific field may be a field previously existing in the DCCT or a field that is newly defined.

As a result of the decision (S906), if the DCC includes the information associated with the emergency alert system, a tuning to an emergency alert channel, an emergency alert message output, a guide message output and the like are controlled using a specific field of the DCCT or the DCCSCT (S907).

Of course, a previously existing field can be used as the specific field or a new field is added to be defined as the specific field, which is explained in the descriptions of the first to seventh embodiments of the present invention to be skipped in the following description.

Meanwhile, as a result of the decision (S906), if the DCC does not include the information associated with the emergency alert system, information of a virtual channel and a corresponding A/V PID are detected (S908).

It is decided whether the virtual channel is a valid channel (S909).

As a result of the decision (S909), if the virtual channel is not the valid channel, it is displayed that the valid channel or signal does not exist (S910).

A reception of a new valid channel information table is tried again (S911).

As a result of the decision (S909), if the virtual channel is the valid channel, AV/VID of the corresponding virtual channel is set (S912).

A number of the channel, channel information and the like are displayed (S913).

While an outputted broadcast video is being displayed (S914), it is decided whether an input signal of a channel change request is applied to the digital broadcast receiver 801 (S915).

As a result of the decision (S915), if the input signal of the channel change request is not applied to the digital broadcast receiver 801, it goes back to the step S914.

On the other hand, as a result of the decision (S915), if the input signal of the channel change request is applied to the digital broadcast receiver 801, it goes back to the step S902.

Meanwhile, as a result of the decision (S915), if an input signal of a virtual channel change request is not applied to the digital broadcast receiver 801, it goes back to the step S912.

Meanwhile, terminologies used in the description of the present invention are defined as considering functions in the present invention, which are variable according to usual practice or intentions of those who skilled in the art. Hence, their definitions shall be given based on the overall contents of the present invention.

Accordingly, the present invention provides the following effects.

First of all, the present invention can effectively use broadcast channels in case of an emergency occurrence not by using all the broadcast channels in broadcasting news associated with an emergency.

Secondly, news about an emergency can be quickly and accurately notifies to viewers without adding a separate table within a PSIP to provide information associated with the emergency to the viewers in case of an emergency occurrence.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An emergency alert signaling method for use by a terrestrial digital television (DTV) receiver, the method comprising:
    receiving a digital television signal including a direct channel change table (DCCT) from a broadcast transmitter, wherein the DCCT contains a priority code, a dcc selection type field of the DCCT and channel ID information;
    parsing the channel ID information and the priority code from the DCCT, wherein the channel ID information specifies an emergency alert channel associated with an emergency alert event and the priority code specifies an alert priority of the emergency alert event; and
    automatically tuning to the emergency alert channel based upon the alert priority.

2. The method of claim 1, further comprising parsing an originator code from the DCCT, wherein the originator code specifies an entity that provides alert information associated with the emergency alert event.

3. The method of claim 1, further comprising parsing an event code from the DCCT, wherein the event code specifies a type of the emergency alert event.

4. The method of claim 1, further comprising parsing tuning time information from the DCCT, wherein the tuning time information specifies a tuning start time and a tuning end time.

5. The method of claim 1, wherein the channel ID information includes a first data field indicating a major channel number of the emergency alert channel, and a second data field indicating a minor channel number of the emergency alert channel.

6. A digital television receiver, comprising:
    a tuner arranged to receive a digital television signal including a direct channel change table (DCCT) from a broadcast transmitter, wherein the DCCT contains a priority code, a dcc selection type field of the DCCT and channel ID information;
    a demodulator arranged to demodulate the digital television signal;
    a demultiplexer arranged to demultiplex the DCCT from the demodulated television signal;
    a decoder arranged to parse the channel ID information and the priority code from the DCCT, wherein the channel ID information specifies an emergency alert channel associated with an emergency alert event and the priority code specifies an alert priority of the emergency alert event; and
    a controller arranged to control operation of the tuner to automatically tune to the emergency alert channel based upon the alert priority.

7. The digital television receiver of claim 6, wherein the decoder further parses an originator code from the DCCT, wherein the originator code specifies an entity that provides alert information associated with the emergency alert event.

8. The digital television receiver of claim 6, wherein the decoder further parses an event code from the DCCT, wherein the event code specifies a type of the emergency alert event.

9. The digital television receiver of claim 6, wherein the decoder further parses tuning time information from the DCCT, wherein the tuning time information specifies a tuning start time and a tuning end time.

10. The digital television receiver of claim 6, wherein the channel ID information includes a first data field indicating a major channel number of the emergency alert channel, and a second data field indicating a minor channel number of the emergency alert channel.

* * * * *